US006470945B1

(12) United States Patent
Biagiotti

(10) Patent No.: US 6,470,945 B1
(45) Date of Patent: Oct. 29, 2002

(54) EMBOSSING AND LAMINATING DEVICE FOR WEB MATERIAL

(75) Inventor: Guglielmo Biagiotti, Capannori Lucca (IT)

(73) Assignee: Fabio Perini S.p.A., Lucca (IT)

( * ) Notice: Subject to any disclaimer, the term of this patent is extended or adjusted under 35 U.S.C. 154(b) by 0 days.

(21) Appl. No.: 09/601,798

(22) PCT Filed: Feb. 8, 1999

(86) PCT No.: PCT/IT99/00029

§ 371 (c)(1), (2), (4) Date: Aug. 8, 2000

(87) PCT Pub. No.: WO99/41064

PCT Pub. Date: Aug. 19, 1999

(30) Foreign Application Priority Data

Feb. 13, 1998 (IT) .......................................... FI98A0031

(51) Int. Cl.[7] ............................ B31F 1/07; B32B 3/28; B32B 3/30

(52) U.S. Cl. ....................... 156/553; 156/555; 156/556; 156/209; 162/113; 162/362

(58) Field of Search ................................ 156/209, 553, 156/556, 219, 555; 162/113, 362

(56) References Cited

U.S. PATENT DOCUMENTS

| | | | | |
|---|---|---|---|---|
| 3,694,300 A | | 9/1972 | Small | |
| 4,376,671 A | * | 3/1983 | Schulz | 156/549 |
| 5,382,464 A | * | 1/1995 | Ruppel et al. | 428/172 |
| 5,736,223 A | * | 4/1998 | Laurent | 428/154 |
| 6,106,928 A | * | 8/2000 | Laurent et al. | 162/113 |
| 6,109,326 A | * | 8/2000 | Leakey et al. | 156/553 |

FOREIGN PATENT DOCUMENTS

| | | | | |
|---|---|---|---|---|
| EP | 0 370 972 | | 5/1990 | |
| GB | 1225440 | | 3/1971 | |
| IT | 1213842 | | 1/1990 | |
| IT | WO 97/20689 | * | 6/1997 | B31F/1/07 |
| WO | WO9853985 | | 12/1998 | |

* cited by examiner

*Primary Examiner*—Richard Crispino
*Assistant Examiner*—Sue A. Purvis
(74) *Attorney, Agent, or Firm*—Breiner & Breiner, L.L.P.

(57) ABSTRACT

A device for embossing and laminating a multiple-web web material, comprising: a first and second embossing cylinder (1, 3), provided with tips and arranged with parallel and adjacent axes so as to farm a nip (G) between them; a pair of pressure rollers, (5, 7), each of which cooperates with one of the embossing cylinders; an adhesive applicator (17) associated with the first embossing cylinder; and a laminating roll (13) arranged downstream of the nip (G) between the embossing cylinders (1, 3) and cooperating with the first embossing cylinder (1). Planes (P3, P5) contain axis (1A, 3A) of each embossing cylinder (1, 3) and the axis (5A, 7A) of the corresponding pressure roll (5, 7) are both inclined with respect to the plane. (P2) containing the axes (1A, 3A) of the embossing cylinders at an angle different from 0 and 90 degrees.

17 Claims, 6 Drawing Sheets

EMBOSSING AND LAMINATING DEVICE FOR WEB MATERIAL

TECHNICAL FIELD

The present invention relates to a device for embossing and laminating continuous plies for forming a web material.

More particularly, the present invention relates to an embossing and laminating device of the type comprising a pair of embossing cylinders, each co-operating with a respective pressure roll, with a glue applicator for applying an adhesive onto at least one of the embossed plies, and with laminating means which cause joining together of two plies separately embossed between each embossing cylinder and the respective pressure roll.

STATE OF THE ART

In the paper converting industry, for the production of toilet paper, all-purpose drying paper, paper napkins, tissue paper in general and similar products, embossing is frequently used in order to modify the characteristics of softness and absorbency of the paper.

Different embossing and joining systems exist for the production of embossed web materials obtained by joining together several plies. In particular, there are systems in which the two or more plies of continuous material are separately embossed and then joined together. These systems can be divided up basically into tip-to-tip joining systems and nested joining systems, so-called random nesting or "DERL" systems or the like.

In the first case (see EP-B-0,370,972), two plies are each embossed between an embossing cylinder, provided with projections or tips arranged in a repetitive pattern, and a pressure roll, normally lined with resilient material, such as rubber or the like. Subsequently the two plies are joined together by means of laminating between the two facing embossing cylinders which are phase-synchronized with one another so that, in the laminating nip between the two cylinders, the tips of one cylinder are located opposite the tips of the other one, the distance between the cylinders being such as to cause laminating of the plies between the facing tips. Usually, before laminating, an adhesive is applied onto one of the two plies, in the relief zones produced by embossing.

Nested-type embossing and joining together, on the other hand, involves the plies which are separately embossed in a similar manner to that described above being joined together so that the projections of one ply are arranged in between the projections of the other one. In such cases the two embossing cylinders are not pressed against one another in the nip between them and the two plies are joined together by means of laminating between one of the two embossing cylinders and a joining roller. This technique is described in GB-B-1,225,440 and in U.S. Pat. No. 3,694,300.

Italian patent No. 1,213,842 (Application No. 9519A/87) describes an embossing unit of the tip-to-tip type which has been modified so as to be able to produce nested embossing of the random type ("DERL"). This is obtained by introducing a deviating element which modifies the path of one of the two plies between the embossing zone and the laminating zone.

Italian Utility Model Application No. 21,325B/89 describes a device which allows embossing both of the nested type and embossing of the tip-to-tip type to be performed by modifying as required the arrangement of the components of the device. Basically, in order to change from one type of processing to the other type, it is necessary to modify entirely the arrangement of the embossing cylinders. In fact, according to this known technique, it is suggested basically to convert on each occasion a proper tip-to-tip embossing unit into a proper nested embossing unit. This involves very long operation times in order to pass from one type of embossing system to the other. Moreover, in this device, in order to be able to arrange the laminating roll in a position such that it is able to cooperate with one of the embossing cylinders, it hasbeen necessary to arrange the axes of the two embossing cylinders and the two pressure rolls on a single common horizontal plane. This involves considerable drawbacks due to the deformations of the embossing cylinders, caused by the high pressures necessary for embossing, with consequent non-uniform embossing and laminating of the plies between the center and the edges.

OBJECTS AND SUMMARY OF THE INVENTION

The object of the present invention is to provide an embossing/laminating device which is able to operate in tip-to-tip or nested mode and which allows easy conversion from one type of embossing to the other, reducing to a minimum the operations of adjustment and regulation of the device.

Yet another object of the present invention consists in providing a configuration which allows the existing embossing/laminating units, of the tip-to-tip-type, to be converted in a rapid and economic manner into dual-purpose embossing/laminating units suitable for producing embossed material (comprising several glued plies) using the nested technique and the tip-to-tip technique, alternately.

A further object of one improved embodiment of the present invention is the provision of an embossing unit in which the embossing cylinders and the pressure rolls are arranged so as to reduce the irregularities in the laminated product due to the flexural deformations of the embossing cylinders.

These and further objects and advantages, which will become clear to those skilled in the art from reading of the text which follows, are obtained in an embossing and laminating device of the type comprising: a first and a second embossing cylinder, provided with associated tips or projections, said two embossing cylinders being arranged with parallel axes and arranged adjacent to one another so as to form a nip between them; a pair of pressure rolls, each of which co-operates with one of the embossing cylinders; an adhesive applicator associated with the first embossing cylinder; and a laminating roll arranged downstream of the nip between the embossing cylinders and cooperating with the first embossing cylinder. Basically, according to the invention it is envisaged that the planes containing the axis of each embossing cylinder and the axis of the corresponding pressure roll are both inclined with respect to the plane containing the axes of the embossing cylinders at an angle different from 0° and 90° and that the angle formed by the plane containing the axis of the first embossing cylinder and the respective pressure roll with the plane containing the axes of the two embossing cylinders and directed towards said nip is greater than 90°. Moreover, it is envisaged that said two embossing cylinders should have the same peripheral speeds and that they may be phase-synchronized with each other so as to bring the tips of one embossing cylinder opposite the tips of the other embossing cylinder, or alternatively cause the tips of one embossing cylinder to engage in between the tips of the other embossing cylinder, without necessarily modifying the interaxial distance between the cylinders.

In this case, a greater space for arranging the marrying or laminating roll is created around the first embossing cylinder. This allows one to pass from the tip-to-tip configuration to the nested configuration without moving the embossing cylinders away from one another. The existing tip-to-tip embossing units may be easily modified so as to vary the mutual position of the axes of the pressure rolls and the embossing cylinders and introduce into the space thus formed a laminating roll, this making the unit suitable for producing also web material embossed and joined using the nested technique.

The embossing cylinders may have symmetrical tips arrangements or (in particular when the device is operating in the nested configuration) non-symmetrical arrangements. The embossing cylinders may also be replaced when the device changes over from the tip-to-tip configuration to the nested configuration, or vice versa. The phase-displacement between the tips of an embossing cylinder and the tips of the other cylinder may be obtained with an angular movement or also with a mutual axial movement of the cylinders. In other words, while keeping one of the cylinders at a standstill, the other cylinder may be rotated about its axis, or translated parallel to its axis, by an amount such as to cause its tips to engage in between the tips of the other cylinder.

According to an advantageous embodiment of the present invention, it is also envisaged that the two planes containing the axes of the embossing cylinders and the respective pressure rolls are inclined in directions such as to cause deformations which have components coinciding in the plane containing the axes of the two embossing cylinders. This is obtained by arranging the pressure roll associated with the first embossing cylinder in an angular position which is further away from the nip and the pressure roll associated with the second embossing cylinder closer to the nip. The stresses exerted by the two pressure rolls thus cause, in the plane containing the axes of the two embossing cylinders, deformations in the same direction, which do not affect the conditions of contact between the tips in the laminating nip also when the embossing unit operates using the tip-to-tip technique. A more uniform and regular product is thus obtained.

Further embodiments of the present invention are indicated in the accompanying dependent claims.

BRIEF DESCRIPTION OF THE DRAWINGS

The invention will be better understood with reference to the description and the accompanying drawing, which shows a practical example of the invention itself. More particularly, in the drawing.

DETAILED DESCRIPTION OF THE PREFERRED EMBODIMENT

Figure 1:
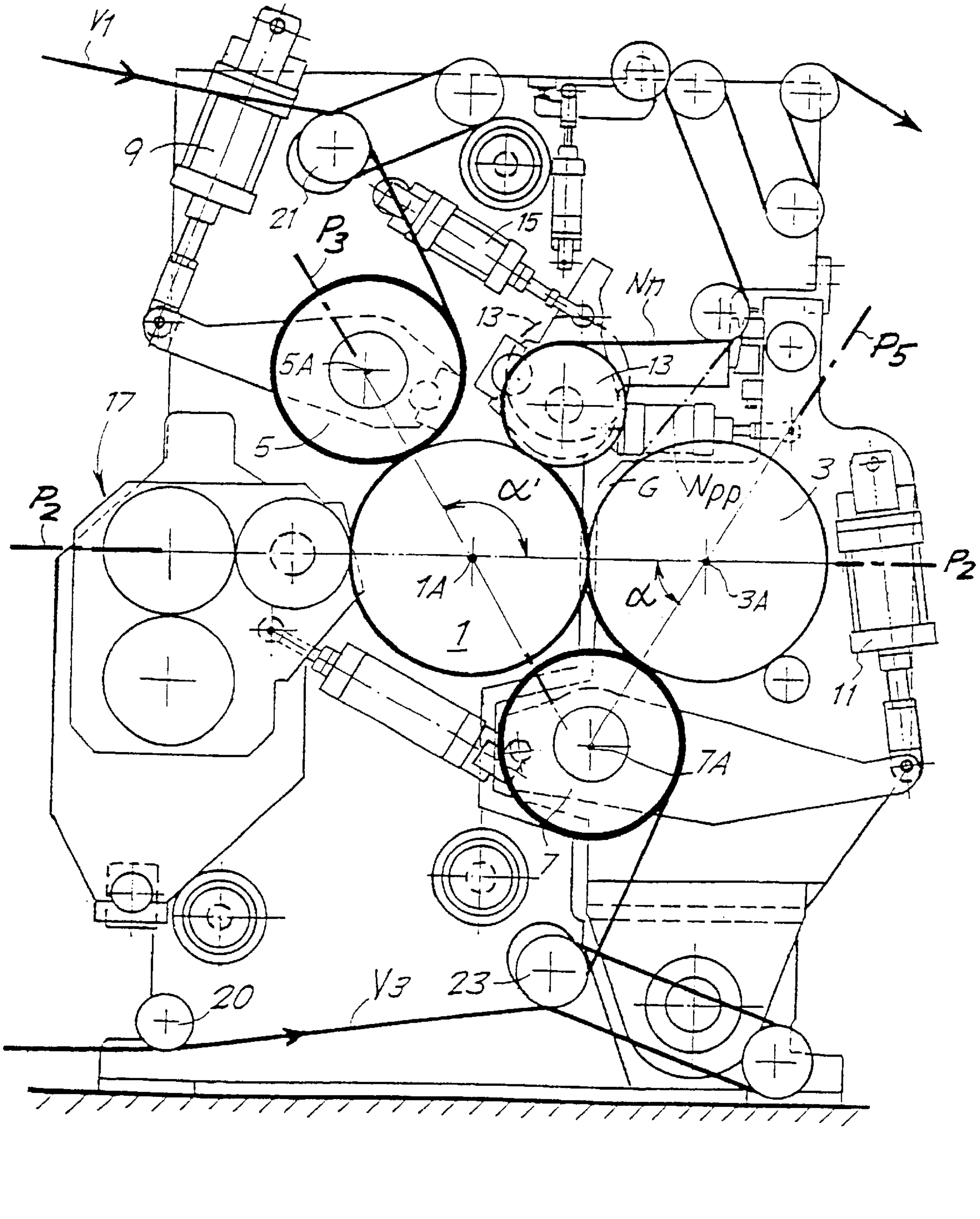
FIG. 1 shows a diagram of the device according to the invention.

With initial reference to FIG. 1, the device comprises a pair of embossing cylinders 1, 3, each of which is provided with a plurality of tips or projections 1P, 3P (schematically shown in FIGS. 2 to 4) arranged in symmetrical patterns on the two cylinders.

The two cylinders 1, 3 are mechanically joined together so as to rotate in opposed directions, as shown by the arrows f1 and f3, and at the same peripheral speed. This may be obtained with a suitable choice of transmission gears, not shown.

In a manner known per se the embossing cylinder 1 cooperates with a pressure roll 5, while the cylinder 3 cooperates with a pressure roll 7. The two pressure rolls 5 and 7 are lined with a layer of resiliently yielding material, for example rubber. Each pressure roll 5, 7 is biased against the respective embossing cylinder 1, 3 by an actuator 9, 11.

Contrary to what happens in traditional embossing units, the pressure rolls 3 and 5 are not positioned either with their axes on a plane perpendicular to the plane containing the axes of the respective embossing cylinders 1 and 3, nor coplanar with the embossing cylinders. As can be seen in FIG. 1, the plane P3 containing the axes 1A and 5A of the embossing cylinder 1 and the pressure roll 5 forms an angle of about 30° with the vertical.

The plane P5 containing the axis 3A of the embossing cylinder 3 and 7A of the pressure roll 7 is also inclined at about 30° with respect to the vertical, but in the opposite direction with respect to the plane P3.

In FIG. 1 $\alpha$ and $\alpha'$ indicate the two angles formed by the planes P3 and P5 with the plane P2 containing the axes 1A, 3A of the two embossing cylinders 1, 3. The two angles $\alpha$ and $\alpha'$ are in this case supplementary (their sum is equal to 180°) and are obtained by displacing the pressure roll 5 associated with the first embossing cylinder 1 so as to move it away from the nip G, while the pressure roll 7 has been moved towards the nip G.

The position of the pressure roll 5 makes available a space around the cylinder 1, between the roll 5 and the cylinder 3, for the arrangement of a marrying or laminating roll 13, cooperating with the cylinder 1, for the purposes clarified below. The laminating roll 13 is controlled by an actuator 15 so as to assume an active position, shown in continuous lines in FIG. 1, where it is pressed against the surface of the embossing cylinder 1, and a non-active position, shown in broken lines where it is not in contact with the cylinder 1.

Having arranged the pressure roll 5 inclined with respect to the vertical plane passing through the axis 1A of the embossing cylinder 1, a flexural stress is generated on the embossing cylinder 1, said stress having a horizontal component (in the plane P2 containing the axes 1A and 3A of the cylinders 1 and 3) which causes a corresponding deformation (camber) in the horizontal plane P2. This deformation would cause a high degree of compression of the projections 1P, 3P in the intermediate zone (in the direction of the axis of the cylinders 1, 3) of the laminating nip G, where the deformation of the cylinder 1 is maximum. In order to avoid this, the pressure roll 7 is also displaced with respect to the vertical containing the axis 3A, so that the stress exerted by the pressure roll 7 on the embossing cylinder 3 causes a flexural deformation of the latter in the plane P2 in the same direction as that caused by the pressure roll on the embossing cylinder 1. The two axes of the embossing cylinders 1 and 3 are thus deformed substantially by the same amount and in the same plane, such that the cooperating projections of the two cylinders are located substantially at the same distance, i.e. are pressed with the same stress against one another, along the entire longitudinal extension of the laminating nip G, when the embossing/laminating unit is operating in the tip-to-tip condition.

The embossing cylinder 1 has, associated with it, an adhesive applicator 17 of the type known per se. It comprises, in the example illustrated, two cylinders, the axes of rotation of which are coplanar with the axes 1A, 3A of the two embossing cylinders 1, 3.

Two plies of material to be embossed, indicated by V1 and V3, are supplied to the device described hitherto. 20 denotes a roll for guiding the ply V3, while 21 and 23 denote two expansion rolls for the plies V1 and V3, respectively. The ply V1 is embossed between the embossing cylinder 1 and the pressure roll 5, while the ply V3 is embossed between the embossing cylinder 3 and the pressure roll 7. After embossing, an adhesive C is applied onto the ply V1 by means of the applicator 17 in a manner known per se.

The two plies V1 and V3 may, Skis point, be joined together in two different ways depending on how the two embossing cylinders 1, 3 are phase-synchronized and the path which the plies follow downstream of the nip G between the embossing cylinders 1,3.

Figure 2:
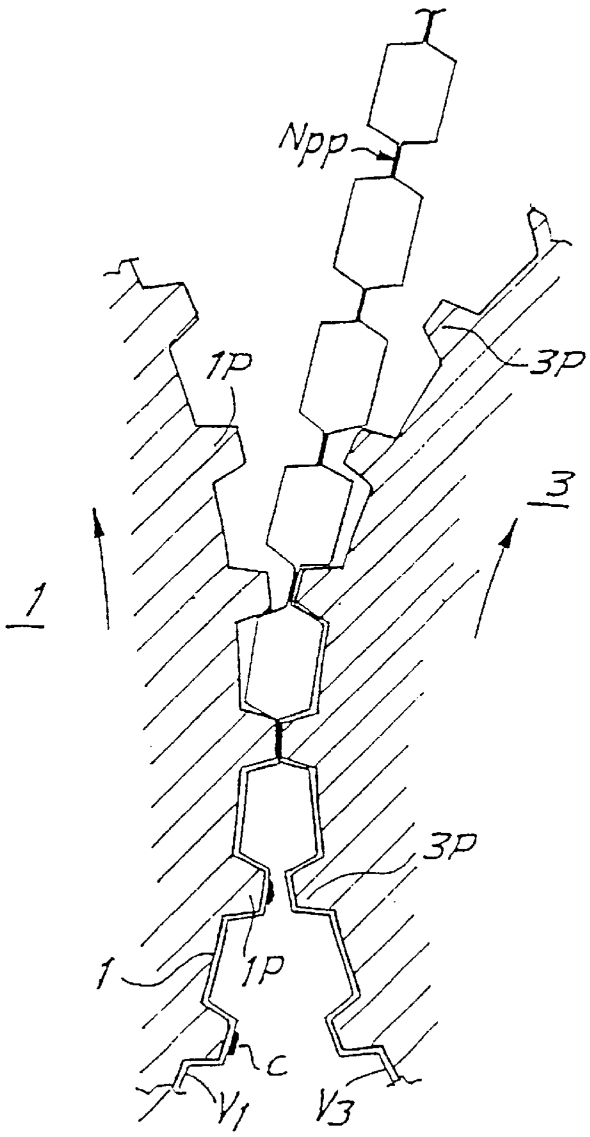
FIG. 2 shows an enlarged schematic cross-section of the nip between the two embossing cylinders during tip-to-tip operation.

FIG. 2 shows an enlarged detail of the nip G between the two embossing cylinders 1, 3 in the position which they assume when the device is regulated to obtain tip-to-tip embossing. In this case the two cylinders 1, 3 are phase-synchronized with each other so that the tips or projections 1P of the cylinder 1 are in phase with the tips 3P of the cylinder 3, namely at the minimum inter-distance point between the two cylinders 1, 3 the tips of one press against the tips of the other one, laminating between them the embossed plies V1 and V3. The glue applied onto the ply V1 causes mutual adhesion of the plies. Downstream of the nip G the web material formed by the two joined plies V1 and V3 follows the path indicated by Npp. In this condition the laminating roll 13 is kept separated from the embossing cylinder 1.

Figure 3:
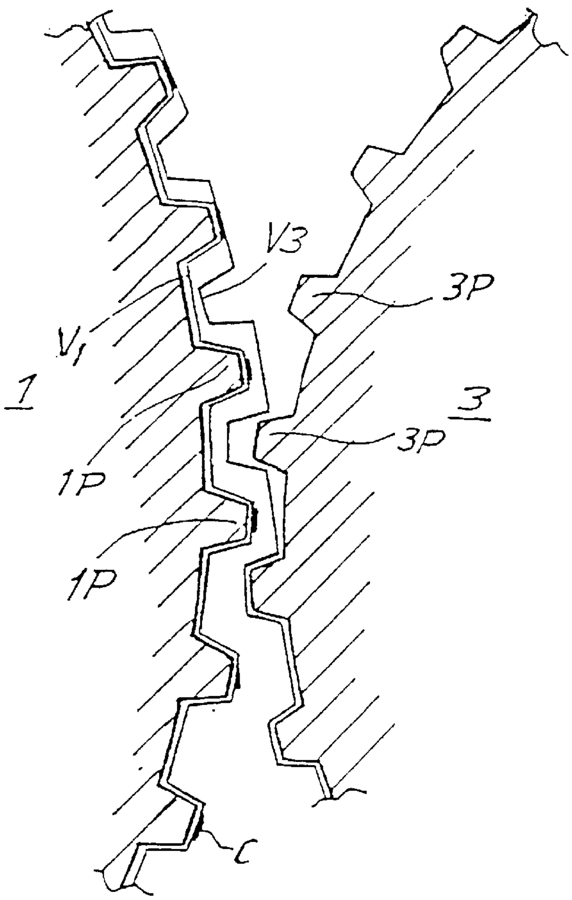
FIG. 3 shows an enlarged schematic cross-section of the nip between the two embossing cylinders during nested operation.
Figure 4:
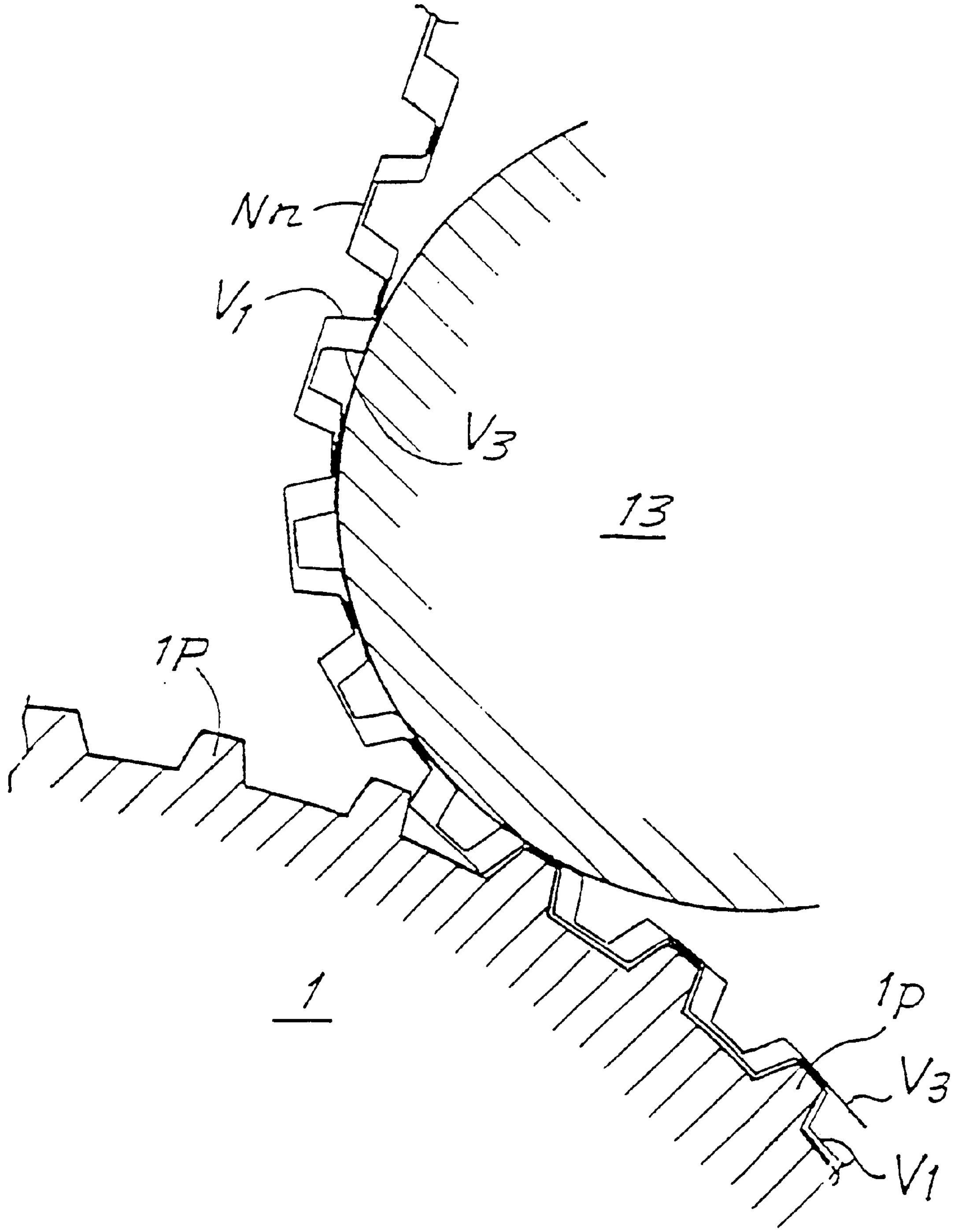
FIG. 4 shows an enlarged schematic cross-section of the laminating zone during nested operation.

FIGS. 3 and 4 show the arrangement of the embossing cylinders 1, 3 and the laminating roll 13 in the case of nested embossing. The two embossing cylinders 1 and 3 are arranged with the same interaxial distance as the preceding example, but are differently phase-synchronized since the tips 1P of the embossing cylinder 1 are engaged in between the tips 3P of the embossing cylinder 3. The two embossed plies V1 and V3 are not laminated in the nip G between the two embossing cylinders 1, 3, but downstream of the nip G, between the laminating roll 13 (which in this case is pressed against the tips 1P of the cylinder 1) and the embossing cylinder 1, as shown in the schematic enlarged view of FIG. 4. Downstream of the laminating roll 13, the web material obtained from joining together of the plies V1 and V3 follows the path Nn.

Figure 5:
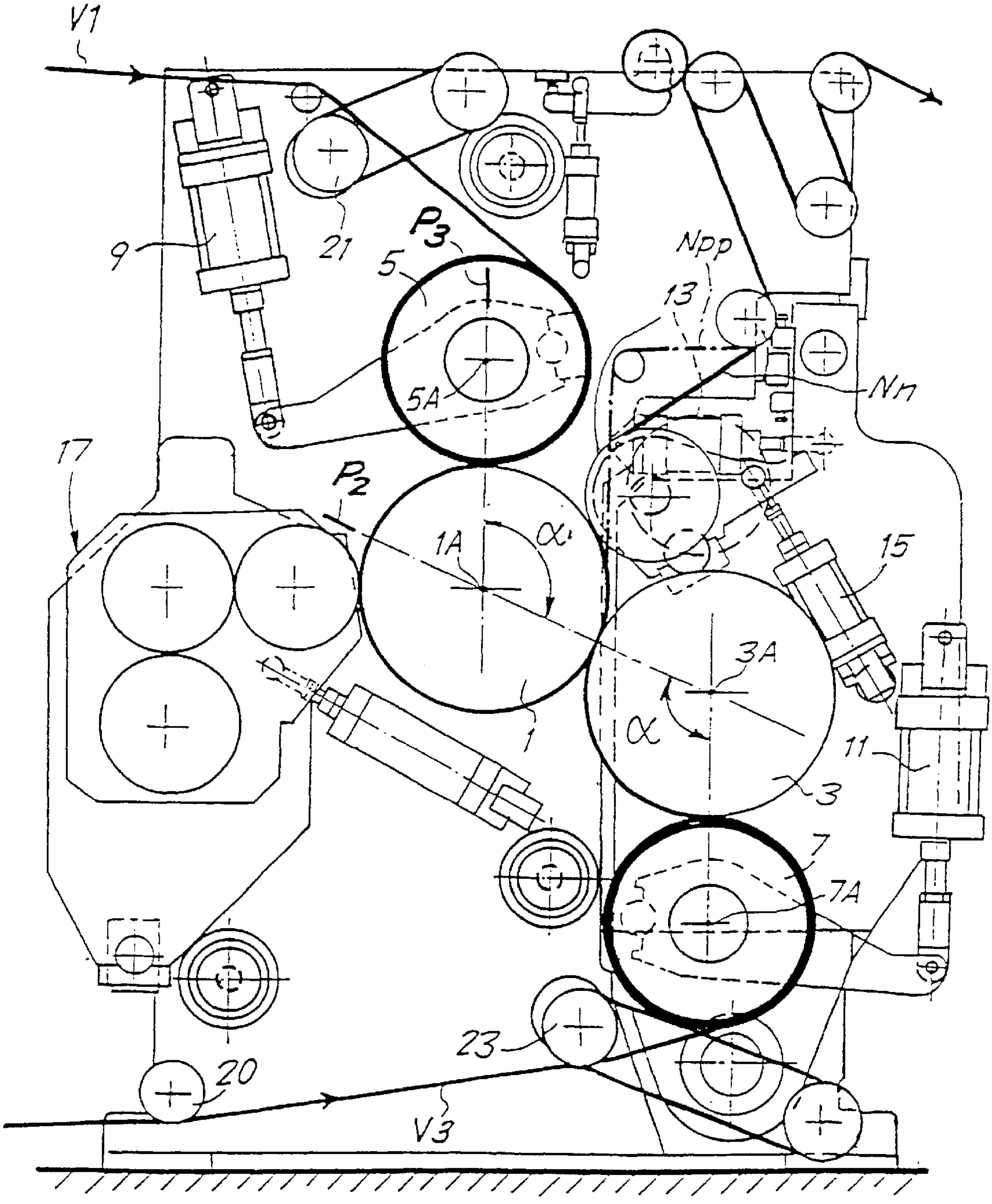
FIG. 5 shows a side view, similar to FIG. 1, of a modified embodiment of the present invention.

FIG. 5 shows a side view; similar to FIG. 1, of a modified embodiment of the present invention. The same numbers indicate parts which are the same or correspond to those of the embodiment according to FIGS. 1 to 4. In this case the plane P2 is inclined with respect to the horizontal, and the planes P3 and P5 form angles $\alpha$ and $\alpha'$ with the plane P2, which are equal to each other. Both the pressure rolls 5 and 7 have been moved away from the nip G.

With this configuration, the space for insertion of the laminating roll 13 is again obtained, but there is no compensating effect on the flexural deformations of the two embossing cylinders 1 and 3 on the plane P2. It is therefore a configuration which is particularly suitable when the embossing device is intended mainly to operate using the nested technique.

Both the configurations may be obtained with simple modifications of the existing tip-to-tip embossing units, which may thus be rapidly converted into dual-purpose units.

Figure 6:
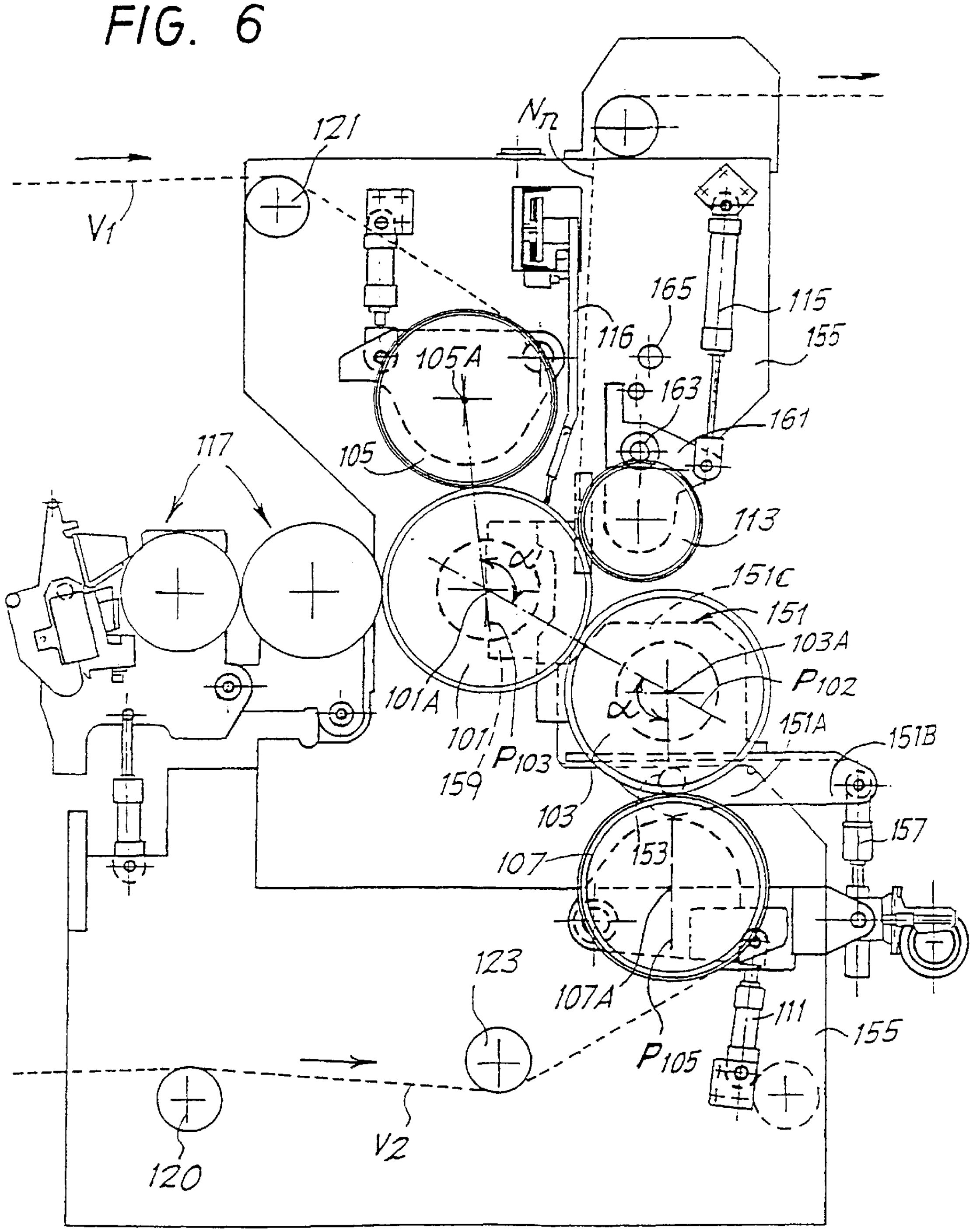
FIGS. 6 and 7 show an embodiment of the device according to the present invention in which the operative configuration can be changed by replacement of a pair of sides and of the embossing cylinders if necessary.
Figure 7:
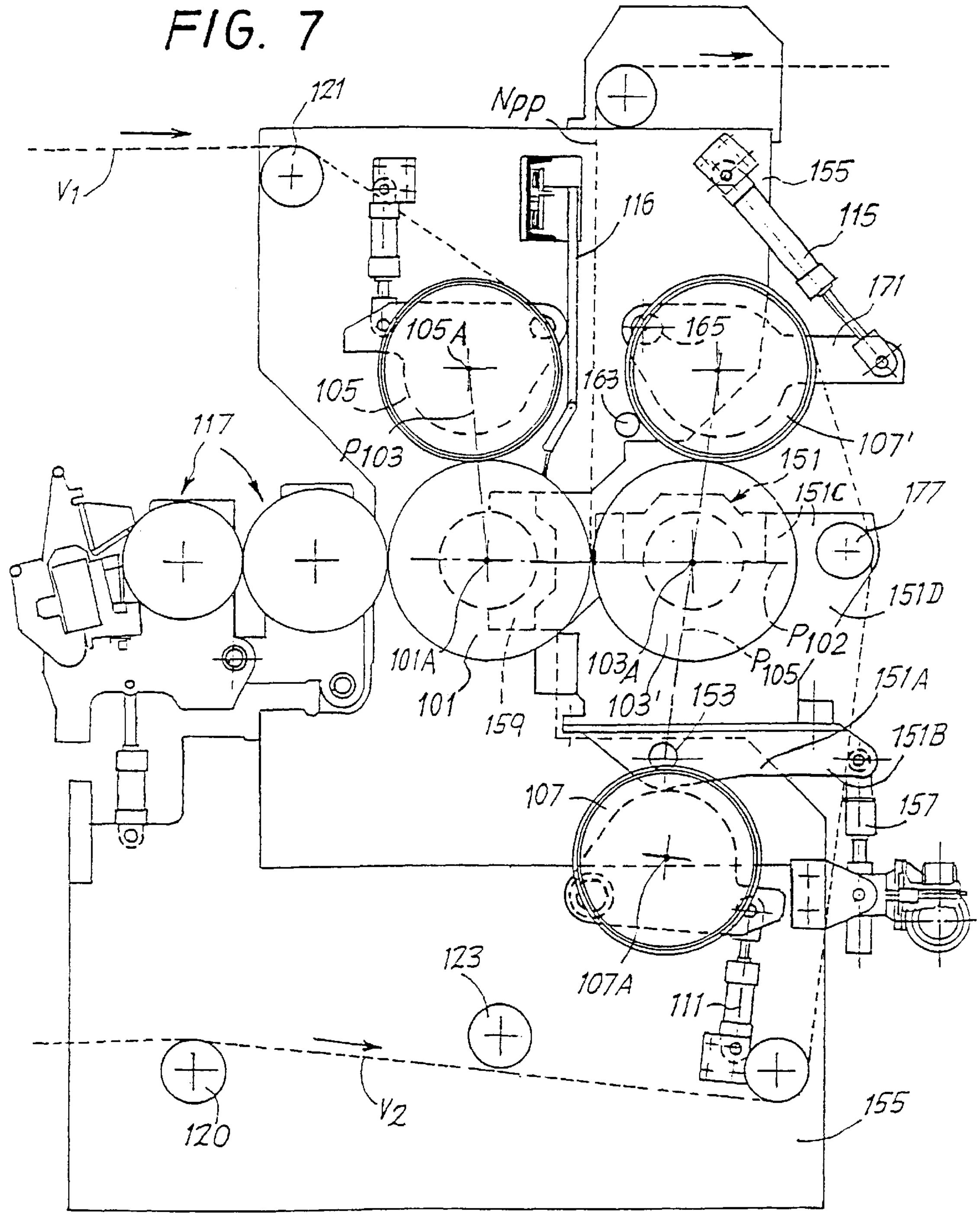

FIGS. 6 and 7 show an embodiment of the device according to the present invention in which the conversion of the embossing cylinders arrangement to move from one type of embossing to the other or vice versa is particularly simple. FIG. 6 shows the configuration for the nested mode while FIG. 7 shows the same device in configuration for the tip-to-tip mode of operation.

The device in the configuration of FIG. 6 will firstly be described. In FIG. 6 same parts or parts corresponding to those of FIG. 5 are indicated with the same reference numbers increased by 100. The device includes a first embossing cylinder 101 and a second embossing cylinder 103, having rotation axes 101A and 103A arranged on a plane P102 which is inclined with respect to the horizontal. The first embossing cylinder 101 cooperates with a first: pressure roll 105 and the second embossing cylinder 103 cooperates with a second pressure roll 107, both pressure rolls being lined with a yielding material. The two pressure rolls 105 and 107 are arranged above and below the inclined plane P102 respectively, on which the axes 101A and 103A of the embossing cylinders 101, 103 are arranged. The axes of pressure rolls 105 and 107 are shown at 105A and 107A, while P103 and P105 indicate respectively the plane including the axis 105A of the pressure roll 105 and the axis 101A of embossing cylinder 101 on the one side and the axis 107A of pressure roll 107 and the axis 103A of the second embossing cylinder 103 on the other. The angles formed by the plane P102 with plane P105 and plane P103 respectively are shown at $\alpha$ and $\alpha'$ respectively.

The first embossing cylinder 101 cooperates also with a laminating roll 113 and with a glue applicator 117. Between the laminator roll 113 and the pressure roll 105 a cleaning brush 116 operates, which has the function of cleaning the surface of the embossing cylinder 101.

The second embossing cylinder 103 is supported by a pair of sides, only one of which is shown in FIG. 6 and labeled 151. Each side 151 is divided into two portions: the first portion 151A is pivoted at 153 to the fixed structure 155 of the device and is provided with an arm 151B upon which a thrust actuator 157 acts. The second portion 151C of the side 151 is mounted on portion 151A in such a way as to be removable therefrom and is provided with seats for the bearings for embossing cylinder 103.

As it will be apparent from the drawing, by removing portion 151C of the side 151 the corresponding bearing 159 of the first embossing cylinder 101 is made easily accessible thus allowing an easy disassembly and replacement thereof.

The laminating roll 113 is supported by a pair of small sides 161 pivoted at 163 to the fixed structure 155 of the device. Each small side 161 is combined to a thrust actuator 115 acting upon it, equivalent to actuator 15 of FIG. 5, which pushes the laminating roll 113 against the first embossing cylinder 101.

Above each pivot 163 of the small sides 161 a seat 165 is provided for supporting a further pressure roll which can be used in alternative to the pressure roll 107 and to the laminating roll 113 as will be made clear when describing the arrangement shown in FIG. 7.

The motion between embossing cylinders 101 and 103 is transmitted via a gear train transmission. The latter allows, when requested, to modify the angular phase between the two embossing cylinders in order to bring the tips of one cylinder to correspond to the tips of the other (tip-to-tip mode of operation) or to be located in between the tips of the other cylinder alternatively (nested mode of operation). However, in the arrangement of FIG. 6 the device operates preferably in the nested mode and therefore the tips of the two embossing cylinders 101, 103 are arranged in such a way that they do not correspond to one another so that the two plies V1, V2 are not laminated between the two embossing cylinders 101, 103 which are not in mutual contact. The plies are rather laminated between the first embossing cylinder 101 and the laminating roll 113.

When it is desired to use the device of FIG. 6 in the tip-to-tip mode it is preferred to convert the configuration thereof moving to the arrangement shown in FIG. 7. The modification includes the replacement of portions 151C of the sides 151 with different portions 151D which support a modified embossing cylinder 103'. The latter cooperates with embossing cylinder 101 which may be the same as in the arrangement of FIG. 6 or may have been replaced with another having a different embossing pattern. It has indeed been noticed that by moving from the nested-embossing mode to the tip-to-tip embossing mode it is preferable to replace both the embossing cylinders in order to use in each case a pattern of tips which is specifically designed for the kind of embossing and lamination technique used. For this purpose the device of FIGS. 6 and 7 has been designed in such a way that not only the pair of portions 151C of sides 151 are easily disassembled, but also the first embossing cylinder 101 can be rapidly disassembled and replaced by means of a fast access to bearings 159 thereof.

The new embossing cylinder 103' cooperates with a pressure roll 107' replacing pressure roll 107 (which remains inactive or may be removed). The pressure roll 107' is supported by small sides 171 pivoted near seat 165. Each small side 171 is connected to the same thrust actuator 115 which in the arrangement of FIG. 6 acts on the small sides supporting the laminating roll 113. The latter has been removed in order to provide the room necessary for the pressure roll 107'. Therefore, in this arrangement the actuator 115 performs the function of actuator 11 of the device shown in FIG. 5, while in the arrangement of FIG. 6 said function was performed by actuator 111.

It should be noted that the embossing cylinder 103' may be actually different from cylinder 103 (e.g. it may have a different pattern), or it may be the same cylinder 103 arranged in a different position.

On the side portions 151D an auxiliary deflecting roll 177 is also provided for deflecting the ply V2, whose path is different from the path followed in the arrangement of FIG. 6.

It is understood that the drawing shows only one example provided solely by way of a practical demonstration of the invention, the forms and arrangements of said invention being able to be varied, without thereby departing from the scope of the idea underlying the invention itself. The presence of any reference numbers in the accompanying claims has the purpose of facilitating reading of the claims with reference to the description and the drawing and does not limit the scope of protection represented by the claims.

What is claimed is:

1. A device for embossing and laminating a multiple ply web material, comprising: a first embossing cylinder having a first axis and a second embossing cylinder having a second axis, the first embossing cylinder and the second embossing cylinder each having tips thereon and each being arranged adjacent to one another such that the first axis and the second axis are parallel to one another and contained within a first plane, wherein the first embossing cylinder and the second embossing cylinder form a nip therebetween and rotate at a common peripheral speed and in opposite directions; a first pressure roll having a third axis, the first pressure roll cooperating with the first embossing cylinder, and a second pressure roll having of fourth axis, the second pressure roll cooperating with the second embossing cylinder, wherein a second plane contains the first axis and the third axis and a third plane contains the second axis and the fourth axis; an adhesive applicator associated with the first embossing cylinder; and a laminating roll arranged downstream of the nip and cooperating with the first embossing cylinder; wherein the first embossing cylinder and the second embossing cylinder are constructed and arranged to be phase-synchronized with each other so that the tips of the first embossing cylinder are opposite the tips of the second embossing cylinder in a tip-to-tip relation, or the tips of either the first embossing cylinder or the second embossing cylinder are positioned between the tips of the second embossing cylinder or the first embossing cylinder, respectively, in a nesting relation, and wherein the second plane is inclined with respect to the first plane at a first angle other than 0° and 90° and the third plane is inclined with respect to the first plane at a second angle other than 0° and 90°, and the first angle is directed downstream of the nip and is greater than 90°.

2. Device as claimed in claim 1, wherein distance between the first axis and the second axis remains substantially unvaried when changing from the tip-to-tip relation to the nesting relation or vice versa.

3. Device as claimed in claim 2, wherein the second plane and the third plane are inclined with respect to the first plane so as to cause in the first embossing cylinder and the second embossing cylinder flexural deformations with components coinciding in the first plane.

4. Device as claimed in claim 3, wherein the first angle and the second angle are supplementary angles.

5. Device as claimed in claim 1, wherein the second plane and the third plane are inclined with respect to the first plane so to cause in the first embossing cylinder and the second embossing cylinder flexural deformations with components coinciding in the first plane.

6. Device as claimed in claim 5, wherein the first angle and the second angle are supplementary angles.

7. Device as claimed in claim 1, wherein the first angle is equal to the second angle.

8. Device as claimed in claim 7, wherein the first plane is inclined with respect to the horizontal.

9. Device as claimed in claim 1, 2, 5, 3, 6 or 4, wherein the laminating roll is moveable between a position wherein the laminating roll presses against the first embossing cylinder or is spaced from the first embossing cylinder.

10. Device as claimed in claim 1, 2, 5, 3, 6, or 4, wherein the first plane is a horizontal plane.

11. Device as claimed in claim 1, 2, 5, 3, 6 or 4, wherein the first pressure roll and the second pressure roll are arranged one on top of the other underneath the first embossing cylinder and the second embossing cylinder, respectively.

12. Device as claimed in claim 1, 2, 5, 3, 6, and 4, wherein the first angle is between 95° and 130°.

13. Device as claimed in claim 1, 2, 5, 3, 6 or 4, wherein the second embossing cylinder is supported by sides made up of two portions which can be disassembled in order to easily replace the second embossing cylinder.

14. Device as claimed in claim 13, wherein upon disassembly of the two portions, bearings of the first embossing cylinder are made accessible.

15. Device as claimed in claim 13, further comprising a third pressure roll, the third pressure roll cooperating with the second embossing cylinder or the second pressure roll.

16. Device as claimed in claim 1, 2, 5, 3, 6 or 4, further comprising a first pair of disassemblable side portions supporting the second embossing cylinder and a second pair of disassemblable side portions supporting the second embossing cylinder, said first and said second pair of disassemblable side portions having seats for bearings of the second embossing cylinder arranged at different heights and being usable alternatively.

17. Device as claimed in claim 16, wherein the second pair of side portions support an auxiliary deflecting roll.

* * * * *

UNITED STATES PATENT AND TRADEMARK OFFICE

CERTIFICATE OF CORRECTION

PATENT NO. : 6,470,945 B1
DATED : October 29, 2002
INVENTOR(S) : Guglielmo Biagiotti It is certified that error appears in the above-identified patent and that said Letters Patent is hereby corrected as shown below:

Title page,
Item [57], ABSTRACT,
Line 4, "farm" should read -- form --.

Column 2,
Line 11, "hasbeen" should read -- has been --.

Column 4,
Line 51, "lines" should read -- lines, --.

Column 6,
Line 23, "first:" should read -- first --.

Column 8,
Line 48, "so to" should read -- so as to --.

Signed and Sealed this

Sixteenth Day of September, 2003

JAMES E. ROGAN
*Director of the United States Patent and Trademark Office*